(12) United States Patent
Thielvoldt et al.

(10) Patent No.: US 9,746,872 B2
(45) Date of Patent: Aug. 29, 2017

(54) FINGER-OPERATED ACCELERATOR MECHANISM

(76) Inventors: Michael Gordon Thielvoldt, Hayward, CA (US); Marvin Gordon Thielvoldt, Benicia, CA (US)

( * ) Notice: Subject to any disclaimer, the term of this patent is extended or adjusted under 35 U.S.C. 154(b) by 0 days.

(21) Appl. No.: 13/452,821

(22) Filed: Apr. 20, 2012

(65) Prior Publication Data

US 2013/0098195 A1     Apr. 25, 2013

Related U.S. Application Data

(60) Provisional application No. 61/477,337, filed on Apr. 20, 2011.

(51) Int. Cl.
G05G 1/04     (2006.01)

(52) U.S. Cl.
CPC .......... G05G 1/04 (2013.01); *Y10T 74/20438* (2015.01); *Y10T 74/20612* (2015.01)

(58) Field of Classification Search
CPC   G05G 1/04; B60T 7/10; B60T 11/165; B62K 23/04; B62K 23/06; B60L 1/00; B62L 1/00
USPC ............... 74/488, 489, 502.2, 569; 180/219; 188/24.11
See application file for complete search history.

(56) References Cited

U.S. PATENT DOCUMENTS

| | | | | |
|---|---|---|---|---|
| 3,633,437 | A | * | 1/1972 | Ishida ............................... 74/489 |
| 4,352,303 | A | * | 10/1982 | Christner ........................ 74/489 |
| 4,364,435 | A | * | 12/1982 | Tuggle et al. ................... 172/15 |
| 4,681,198 | A | * | 7/1987 | Costa Mas ....................... 192/35 |
| 4,685,692 | A | * | 8/1987 | Fullilove et al. .............. 280/234 |
| 4,899,610 | A | | 2/1990 | Bourret |
| 5,078,023 | A | | 1/1992 | Scarborough |
| 5,325,735 | A | * | 7/1994 | Nagano ......................... 74/502.2 |
| 5,775,167 | A | | 7/1998 | Maietta |
| 6,263,754 | B1 | * | 7/2001 | Wesling et al. .................. 74/489 |
| 6,318,490 | B1 | * | 11/2001 | Laning ........................... 180/170 |
| 6,393,933 | B2 | | 5/2002 | Shirayanagi |
| 6,450,059 | B1 | * | 9/2002 | Ose ............................... 74/501.6 |
| 6,551,153 | B1 | | 4/2003 | Hattori |
| 6,658,965 | B2 | | 12/2003 | Allen |

(Continued)

FOREIGN PATENT DOCUMENTS

| | | | | |
|---|---|---|---|---|
| DE | DAS 1 096 783 | * | 9/1956 | ............. B26K 23/04 |
| DE | 30 12 034 A1 | * | 10/1981 | ............. B26K 23/04 |

(Continued)

OTHER PUBLICATIONS

Derwent-ACC-No. 1981-K9918D of DE 30 12 034 A1; Christner; Oct. 1981.*

(Continued)

*Primary Examiner* — Vinh Luong

(57) ABSTRACT

An accelerator for small motor-vehicles allows an operator to control vehicle power output by flexing his or her index finger. The accelerator is designed for mounting on a handlebar but does not require a rotatable grip for operation. A lever is provided that rotates with applied force from the index finger, the lever rotating about an axis that is parallel or nearly parallel with the part of the handlebar that the hand rests on. A brake lever is also described that may be operated by the same hand that operates the accelerator.

18 Claims, 9 Drawing Sheets

(56) References Cited

U.S. PATENT DOCUMENTS

| | | | | |
|---|---|---|---|---|
| 6,695,086 B2* | 2/2004 | Kawamoto | ............ | F16H 48/08 |
| | | | | 180/197 |
| 7,290,462 B2* | 11/2007 | Hou | ............................... | 74/507 |
| 7,571,665 B2* | 8/2009 | Sandstrom | ........... | A01D 34/902 |
| | | | | 74/502.2 |
| 7,581,464 B2 | 9/2009 | Munz | | |
| 7,628,094 B2* | 12/2009 | Owyang | ............... | B60T 11/046 |
| | | | | 74/500.5 |
| 7,677,771 B2* | 3/2010 | Yamamoto et al. | .......... | 362/474 |
| 7,735,392 B2* | 6/2010 | Poulos, Jr. | ............ | B62K 23/04 |
| | | | | 74/502.2 |
| 8,082,819 B2 | 12/2011 | Case et al. | | |
| 8,464,691 B2* | 6/2013 | Hiei et al. | ..................... | 123/400 |
| 9,152,167 B2* | 10/2015 | Marotto | ................... | B62K 3/16 |
| 2002/0096381 A1* | 7/2002 | Esselink | ................ | B62M 27/02 |
| | | | | 180/182 |
| 2005/0034554 A1* | 2/2005 | Hou | ....................... | B62K 23/04 |
| | | | | 74/501.6 |
| 2006/0225937 A1* | 10/2006 | Lemoine | ................ | B62K 23/02 |
| | | | | 180/219 |
| 2009/0013816 A1* | 1/2009 | Munz | .................... | B62K 11/14 |
| | | | | 74/480 R |
| 2009/0107280 A1* | 4/2009 | Case | ...................... | B62K 23/06 |
| | | | | 74/480 R |
| 2010/0313696 A1* | 12/2010 | Vellutini | ................ | B62K 23/06 |
| | | | | 74/491 |
| 2013/0146385 A1* | 6/2013 | Bowers | ......................... | 180/332 |

FOREIGN PATENT DOCUMENTS

| | | | | |
|---|---|---|---|---|
| DE | 37 06 545 A1 * | 9/1988 | ............. | B62K 11/14 |
| WO | WO 95/18035 * | 7/1995 | ............. | B62K 23/06 |

OTHER PUBLICATIONS

Define "may be," google.com., May 27, 2016.*

Define parallel—Google Search, google.com., May 12, 2017.*

Pete Peterson "Overgrip/Regrip With Gary Semics", Dirt Rider Magazine, Dec. 2009, p. 114.

* cited by examiner

FINGER-OPERATED ACCELERATOR MECHANISM

CROSS-REFERENCE

This application claims the benefit of U.S. Provisional Application No. 61/477,337, filed Apr. 20, 2011, which application is incorporated herein by reference.

FIELD OF THE INVENTION

This invention relates to accelerator mechanisms for small motor vehicles. More particularly, this invention is directed at finger-operated accelerator controls for small motor vehicles.

BACKGROUND OF THE INVENTION

Small motor vehicles including motorcycles, snowmobiles, all-terrain vehicles (ATVs), and personal watercraft generally incorporate hand-operated accelerator mechanisms for modulating the power output from the engine, or in the case of electric vehicles, from the motor. Small motor vehicles are often used in competitions where the performance of the rider and the vehicle, and interactions between rider and vehicle are extremely important. To ride small motor vehicles effectively, riders, especially competitive riders, must be able move comfortably through a wide range of body postures, maintain a grip on the vehicle under extreme accelerations and, at the same time, precisely and uninhibitedly modulate the vehicle controls. These requirements and the need to address them all simultaneously, pose difficult challenges for development of new accelerator designs.

Several standard accelerator designs are employed with varying degrees of popularity among the various types of small motor vehicles. Each standard design suffers from one or more shortcomings relating to the three areas of body posture; grip maintenance; and precise, uninhibited control modulation.

Motorcycles in particular, commonly employ a rotatable hand grip coupled by a cable or pair of cables to an engine's throttle valve. The rider rotates her wrist while gripping the handlebars to control the vehicle's acceleration. These rotatable grip accelerators cause problems in all three areas identified above. When a rider demands maximum acceleration, to rotate the grip fully, she must either: bend her wrist upward sharply and lower her elbow, or temporarily let go of the handlebar in order to overgrip as discussed in the article: Pete Peterson. "Overgrip/Regrip With Gary Semics" Dirt Rider November 2009. Bending the wrist sharply is difficult because the aggressive acceleration subjects the wrist and forearm to substantial tension. Lowering the elbow also restricts and contorts the body position of the rider, adversely impacting rider performance and riding experience.

Thumb-lever accelerator mechanisms are commonly used on ATVs, snowmobiles and personal watercraft. Thumb-lever accelerators are lacking in that they prevent the rider from fully engaging her thumb with the handlebar grip. Full engagement of the thumb with the handlebar is necessary to grip the handlebar tightly. Consequently, thumb lever controls substantially reduce the rider's ability to hang onto the vehicle when encountering severe bumps.

Index-finger lever accelerators, including those discussed in U.S. Pat. Nos. 6,393,933, 5,775,167 have been developed which attempt to address the problems associated with thumb and twist-grip accelerators, but these known technologies introduce different drawbacks. Known index finger accelerators have arrangements similar to those of brake or clutch levers, which include a lever that pivots on an axis that is perpendicular to the handlebar axis, thereby letting the rider pull an end portion of the lever towards the handlebar with one or more fingers. These accelerator arrangements require an unnatural movement of the index finger. Further, the design similarities between these devices and brake lever mechanisms make it difficult to combine both brake and accelerator mechanisms on one end of a handlebar for operation by the same hand. When combining brake and accelerator mechanisms mechanical interference is difficult to avoid, and the two levers are easily confused by the rider because their positions and actuation motions are similar. These arrangements work well for clutch and brake levers but poorly for accelerators.

To understand more fully why the known finger-lever accelerators give rise to an unnatural finger motion, one must make a few observations about the human index finger. The index finger comprises three joints that connect the phalanges of the hand; moving from the base of the finger towards the finger tip, one finds: the metacarpophalangeal joint, the proximal interphalangeal joint, and the distal interphalangeal joint. The proximal and distal interphalangeal joints are hinge joints and therefore permit substantial motion only in one plane, namely flexion and extension. The metacarpophalangeal joint permits some motion in all three planes, but with greatest mobility in flexion and extension. Because all three joints have much greater mobility in flexion and extension than any other motion, the finger tip is primarily mobile in a single plane, relative to the rest of the hand. Known finger-lever accelerators move in manners that have the operating fingertip deviate significantly from this plane of maximum mobility, thereby causing discomfort, fatigue, or inhibited control motion.

Electronics have been used as well in accelerators. US patent application publication 2006/0219455A1 and U.S. Pat. No. 6,371,890 discuss arrangements using torque sensors in a rotatable grip for modulating fuel and air input to the engine in response to torque applied to the hand-grip. While this theoretically avoids the body posture restrictions and grip-releases of conventional twist-grips, these designs give rise to significant positive feedback on the control from the hand reacting to acceleration of the vehicle. This positive feedback can greatly reduce the precision with which the accelerator can be controlled.

U.S. Pat. Nos. 6,551,153 and 7,581,464 discuss arrangements using position sensors attached to finger-levers or linearly-constrained thumb controls. These designs have grip strength and range-of-motion drawbacks similar to the drawbacks of their widely used mechanical counterparts.

Thus there remains a considerable need for a small vehicle accelerator that provides precise, uninhibited access to the full throttle range with a minimal impact on rider's body position and grip strength, with minimum feedback from acceleration of the vehicle and with an acceptable geometry to avoid mechanical interference with a brake lever.

SUMMARY OF THE INVENTION

The present invention is directed to finger-actuated accelerators for small motor-vehicles having actuation paths that reflect the natural movement of the tip of a flexing index finger. The inventive subject matter considers the range of mobility of the tip of a rider's index finger, which lies primarily in a planar region. A central inventive aspect provides a contact area for the finger to push that moves along a spatial path that lies within the planar region of the finger's maximum mobility. A variety of mechanisms are suitable for providing a contact area that is free to move in this planar region including tracks, linkages and linear guides. Of course, small variations from a perfect planar trajectory will always be present in any mechanical system and are not outside the inventive scope.

In a preferred embodiment, the finger contact moves in a circular arc, attached by an arm to a rotatable input lever disposed to the side of the finger. The input lever rotates about a control axis parallel with or nearly parallel with the axis of the proximal interphalangeal joint of the index finger. In this context, the control axis is a degree of freedom that is coupled to the power output of the vehicle. The finger contact may have additional degrees of freedom provided by, for example, a second axis of rotation or a flexible portion of the input lever, but the control axis is the primary degree of freedom responsible for modulating the accelerator.

Many different possibilities are contemplated for communicating motion of a finger contact to the vehicle's engine or motor. In a preferred embodiment, the accelerator engages one end of a throttle cable. In another embodiment, an electronic sensor may be used to detect the position of the finger contact, and transmit that information in the form of an electrical signal to a controller. Thereafter, the controller may directly modulate the output power of the vehicle motor, or in the case of combustion engines, the controller may modulate signals to fuel injectors, throttle body servos, or any number of other devices that control power produced by an engine.

Toward invention embodiments that employ throttle cables, a spool may be advantageously included that retracts a throttle cable by rotating; the spool and input lever rotations being coupled preferably by gear teeth. Alternative techniques for coupling the spool to the input lever include chains, belts, and electric servo systems. As an alternative to using a separate spool, the input lever may be directly connected to a throttle cable.

It may be advantageous to provide a non-linear relationship between the displacement of the input lever and the output of the accelerator. Again, there are numerous ways to accomplish this. In embodiments that interface to a throttle cable with a spool, the surface of the spool could include a cam profile with a non-constant radius. In embodiments that include meshing gear teeth between the input lever and a spool, non-circular gears can be used to vary the ratio of input lever rotation to spool rotation. Additionally, for systems including electronic sensors and controllers, the controller may provide a non-linear function shaped to provide a variable distance ratio so that the rate of cable movement for a given finger-contact movement is not the same near idle settings as for the same finger contact movement near wide-open.

A second and primary object of this invention is to provide an accelerator mechanism and revised brake lever that, in conjunction, allow the throttle and brake of a small motor vehicle to be easily operated by the same hand while also providing a fixed, non-rotatable grip for that hand to grasp.

Various objects, features, aspects, and advantages of the present invention will become more apparent from the following detailed description of preferred embodiments of the invention, along with the accompanying drawings in which like numerals represent like components

INCORPORATION BY REFERENCE

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

DETAILED DESCRIPTION OF PREFERRED EMBODIMENTS

Figure 1:
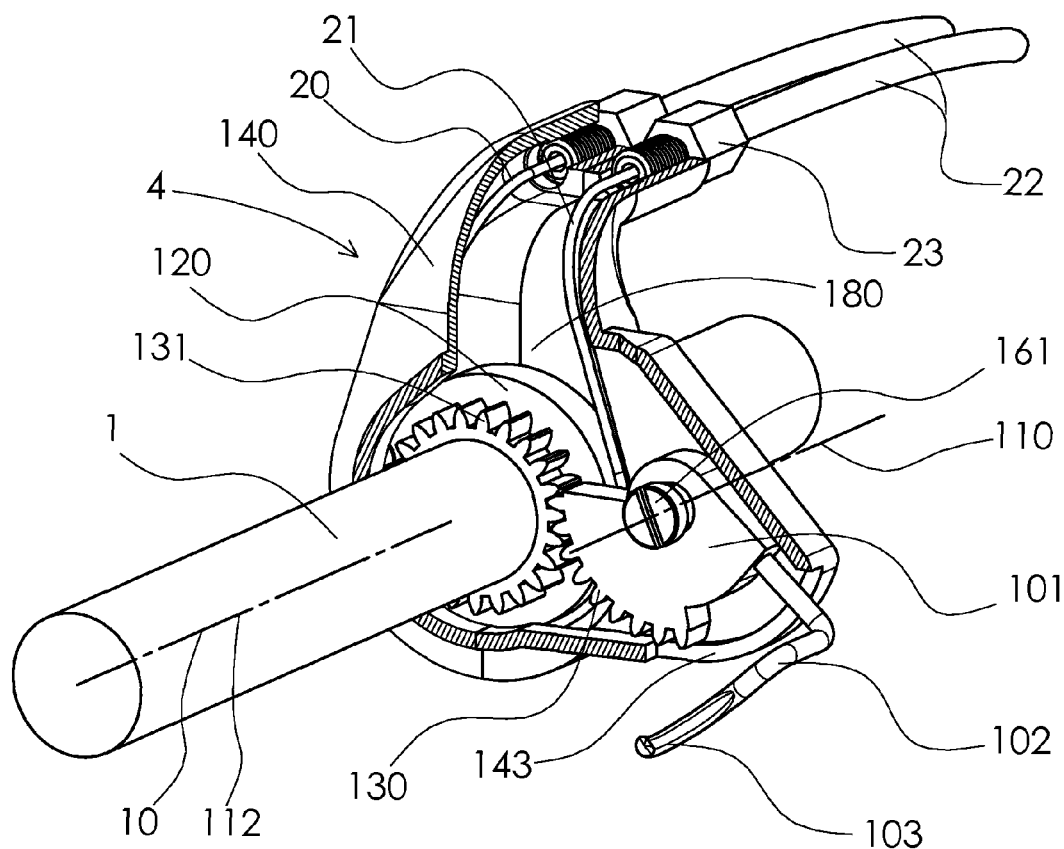
FIG. 1 is a partially cutaway view of a first embodiment showing relative positions of the working components in assembled configuration.

While several preferred embodiments of the invention are shown and described herein, such embodiments are provided by way of example only. Numerous variations, changes, and substitutions will now occur to those skilled in the art without departing from the invention. It should be understood that various alternatives to the embodiments of the invention described herein may be employed in practicing the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

Terminology

Above: taken in the reference frame of the vehicle.

Below: taken in the reference frame of the vehicle.

Control axis: A degree of freedom defining a rotational motion that is the primary mode of operating the accelerator. The control axis is distinct from inactive degrees of freedom, which may permit motion, but which do not strongly affect the power output of the vehicle.

Controller: a device for receiving input signals and producing, as an output, control signals that depend on the input signals. This may be a digital microcontroller, analog electronic circuit, fluidic logic unit, or mechanical device, for example a bimetallic-spring thermostat.

Degrees of freedom: to be taken as applies to the motion of rigid bodies; the number of parameters that define the linear and angular displacement of a body.

Distance ratio: a ratio of one distance to another distance. Such a ratio will be dimensionless.

Extending from: this term may refer to a feature, element or body that is rigidly attached to another base feature, element or body, or which is a part of the same piece of material as the base feature, element or body.

Finger contact: a region of material specifically intended to be in physical contact with a part of an index finger, either by contacting the skin directly, or contacting the finger through a glove.

Forward: taken in the reference frame of the vehicle; this means towards the front of the vehicle.

Power output of the vehicle: the amount of mechanical power being produced by the vehicle's engine or motor at any given moment while operating the vehicle.

Throttle cable: a cable that mechanically connects an engine or motor, with or without a throttle body, to a distal mechanism which allows the power output of the engine or motor to be modulated when the cable is extended or retracted.

Within X degrees of parallel with: When comparing two given vectors, directions, lines, or axes, this term is used to mean that if one imagines two lines extending through the same imagined point in 3-dimensional space, where one line is parallel to the first given vector, direction, line, or axis and the other line is parallel to the second given vector, direction, line or axis, the minimum angle between the two imagined lines will be less than X. Specifically, two 3-dimensional vectors, directions, lines, or axes do not need to intersect to be within a certain number of degrees of parallel with each other.

Within X degrees of perpendicular to: When comparing a given vector, direction, line, or axis to a given plane, this term is used to mean that if the one selects a point on the plane and imagines two lines extending through that point in 3-dimensional space, where one imagined line is normal to the plane, and the other imagined line is parallel to the given vector, direction, line, or axis; the minimum angle between the two imagined lines will be less than X.

First Embodiment

Figure 2:
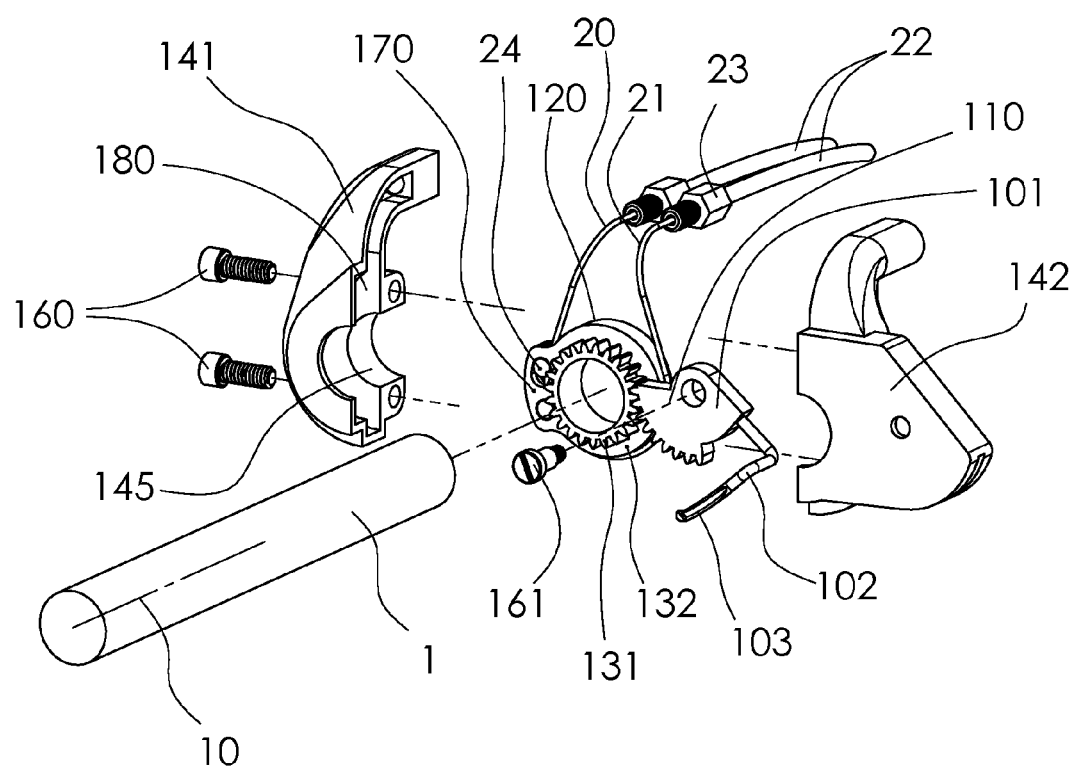
FIG. 2 is an exploded view of a first embodiment showing some geometry hidden in FIG. 1.
Figure 3:
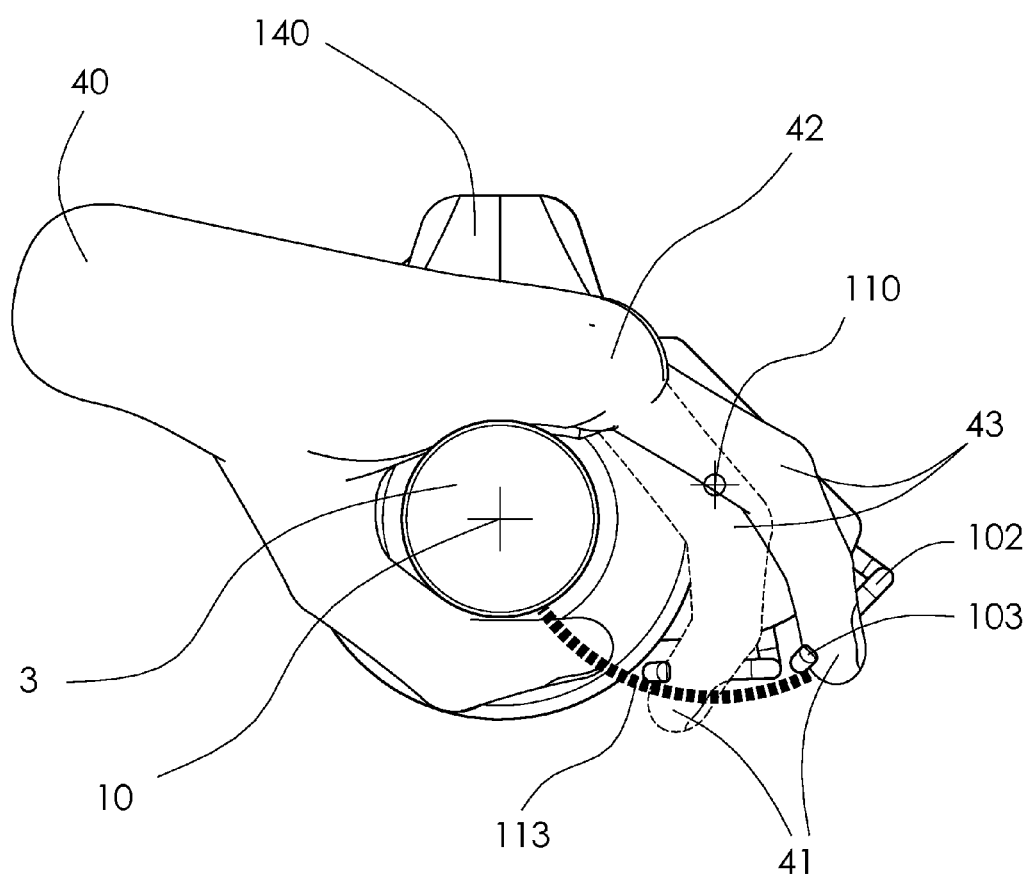
FIG. 3 is a diagram showing actuation path of the mechanism in relation to an operator's hand.

FIGS. 1, 2 and 3 depict the first embodiment of the present invention in several views. Referring now to FIG. 1, the accelerator 4 is shown attached to a handlebar 1. A housing 140 spatially locates an input gear 101, a spool, 120 and the end portions of cables 20 and 21 within it. The input gear 101 and the spool 120 are pivotally mounted with their gear teeth 131, 130 meshing such that rotation of the input gear induces the spool to rotate and vice versa.

In this first embodiment, the rotation axis of the spool 120 is coincident with the centerline axis 10 of the cylindrical end-portion of the handlebar 1, and the rotation axis of the input gear, referred to as the control axis 110 is parallel to the spool rotation axis 112, but is offset from the spool's axis by a distance equal to the sum of the pitch radii of the geared sections 131, 130 of the spool and input gear. To allow rotation, the spool 120 loosely encircles the handlebar 1, and is enclosed within a cavity 180 in the housing 140 to constrain it from sliding up or down the handlebar. The input gear is pivotally mounted on a shoulder bolt 161 and is constrained from moving axially by the walls of the housing.

The input gear 101 includes a formed lever arm 102 that allows the rider to rotate the input gear by pushing on a finger-cradle portion 103 of the arm 102. The lever arm 102 allows the operator's finger (FIG. 3, item 41) to exert a torque on the input gear from a position adjacent to the housing 140. The lever arm shown here has three straight segments separated by 90 degree bends, and one curved section that conforms to a finger. The arm extends through a slot 143 in the housing 140, then to a position outside of the housing and alongside the input gear where it ends in the finger-cradle portion 103. The lever arm can be constructed of any material that is suitably strong and tolerant of outdoor environments such as aluminum, stainless steel, and some strong plastics. Further, this is only one possible geometrical arrangement. Many different geometries and arrangements of the input gear, lever arm and housing slot are also possible without departing from the scope of this invention.

Referring now to FIG. 2, the housing is split into two sections, a left half 141 and right half 142, which are held together by two bolts 160. A cylindrical clamping surface 145 rigidly affixes the housed assembly to the end portion of the handlebar 1 when the two housing halves 141, 142 are bolted together.

The spool is composed of a wear-resistant material, such as acetal, high-density polyethylene plastic, or brass so that it causes minimal abrasion as it rotates on the surface of the handlebar. The spool 120 has two adjacent sections divided by a plane that is perpendicular to the spool's rotation axis. The first section contains the gear teeth 131 that mesh with the input gear's gear teeth. The other section is a cam 132, which cables 20 and 21 wrap part-way around. The cam section 132 contains a geometrical feature 170 that captures the end of the cable 21. In this embodiment, the cable termination 21 is a cylinder. There are many ways to capture the end of a cable, and the geometry shown is only one common arrangement.

The cables 20, 21 mechanically connect the spool 120 to the throttle valve, or other power modulating device on the vehicle's engine or motor. In this embodiment, two cables are used to eliminate the possibility that the throttle valve becomes stuck open and does not close in response to rotation of the spool. In an alternative embodiment, one cable may be used to connect the spool to the vehicle's engine instead of two. In the embodiments shown herein, the cable sheaths 22 end at sheath terminators 23 that engage threaded holes in the top of the housing. The housing also provides a curved surface on which the cables 20, 21 rest to make a gradual 90-degree bend to where they engage the cam section 132 of the spool 120.

Referring to FIG. 3, a rider's hand 40, is shown as it would operate the accelerator. The control axis 110, which is represented by cross-hairs in this view, is located in a region of space roughly between the proximal interphalangeal joint 43 and the metacarpophalangeal joint 42 of the rider's index finger. The end of the index finger naturally traces an approximate arc, 113 as the finger is retracted towards the palm. This positioning is advantageous because it places the input gear's rotation axis approximately at the center of that arc, which means that the motion of the finger cradle will very nearly match the natural path of the operator's fingertip.

When the rider pulls against the finger cradle 103 with her finger, the lever arm 102 transfers the pulling force as a torque to the input gear 101, inducing it to rotate. In turn, the input gear 101 transfers a torque to the spool 120 through the meshing gear teeth 131, 130, causing the spool to rotate. The rotating spool draws a length of cable 20 onto its cam section 132 and allows an equal length of cable 21 to pay off its cam section. This retraction of driving cable 20 and extension of return cable 21, induces the vehicle's throttle valve to open further, thereby causing the vehicle to increase power output. When the rider relaxes her finger, the reverse process occurs, which is motivated by a return spring in the throttle valve assembly (not shown).

This first embodiment as depicted in FIGS. 1-3 uses simple, circular spur gears with constant radii. However, the present arrangement provides the opportunity to use non-circular gears, such as elliptical gears or any other non-circular profile, to introduce a variable ratio of input gear rotation to spool rotation. Improved operability of the vehicle can be obtained by using non-circular gears to provide a lower input-to-spool ratio for near-idle operation, which progresses to a higher ratio as the throttle is opened further. This progressively-increasing mechanical ratio works to counteract the progressively-decreasing ratio of engine-power output to throttle valve displacement, which is inherent in most small combustion engine vehicles. This improves controllability of engine power output by providing a more linear relationship between power output and accelerator displacement. A progressive mechanical ratio can also be achieved using a non-cylindrical surface on the cam section 132 of the spool, either in lieu of or in combination with non-circular gears.

It should be understood that while this embodiment employs sheathed cables to connect the accelerator mechanism to the vehicle's engine, many other methods of control conveyance would also be suitable and within the scope of this invention. For example, an alternative embodiment may employ an electronic system comprising: a position sensor at the accelerator mechanism, an actuator at the throttle body and one or more wires connecting the sensor to the actuator.

Second Embodiment

Figure 4:
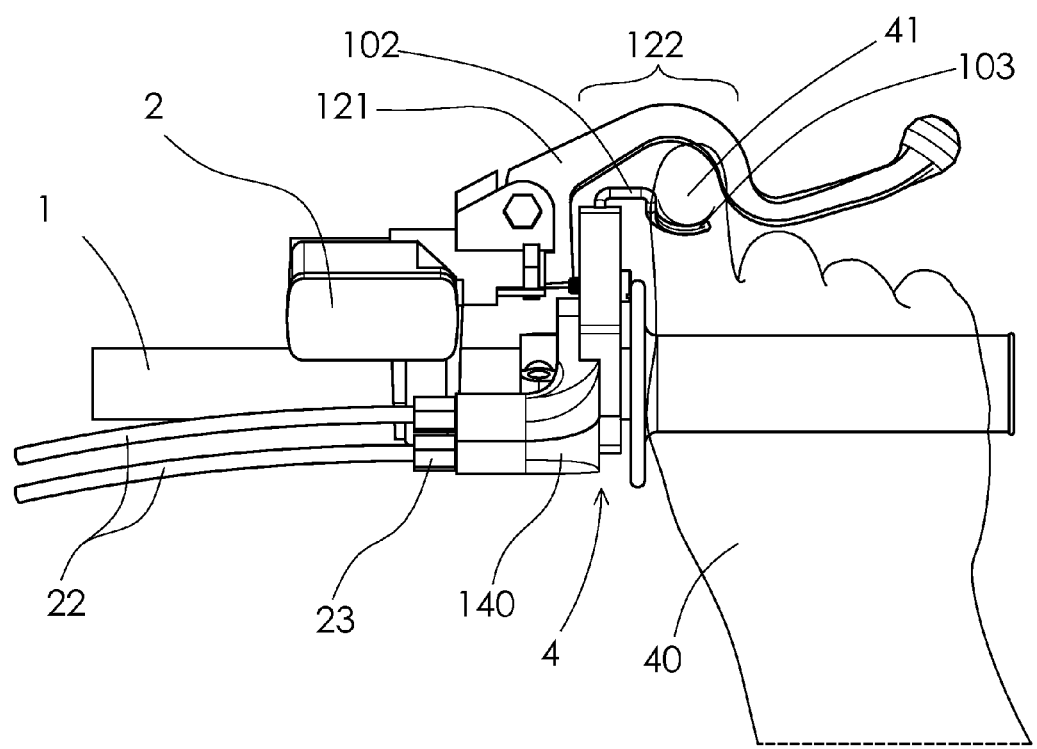
FIG. 4 is a top view of the second embodiment and operator's hand.
Figure 5:
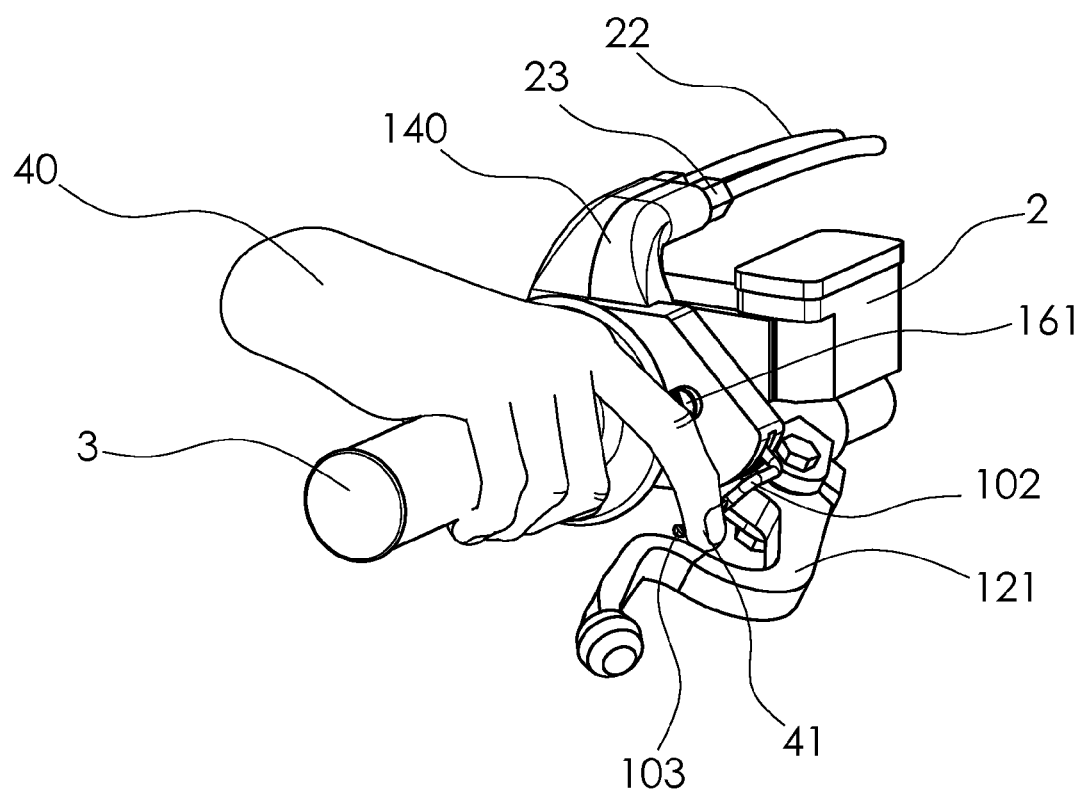
FIG. 5 is a perspective view of second embodiment and hand

FIGS. 4 and 5 detail another primary aspect of this invention, which relates to the spatial arrangement of the accelerator 4 and the geometry of the brake mechanism. Referring to FIG. 4, the geometry of the brake lever 121 allows clearance for the lever arm 102 described above and the tip of the finger 41 that actuates the lever arm. The brake lever 121 incorporates an intermediate section 122 that curves away from the handlebar in the vicinity of the throttle lever arm 102, and then returns to a position that is convenient for the operator to access with her middle finger. A brake lever such as this can be mounted on a standard brake perch 2. Referring to FIG. 5, the rider's palm rests on a handlebar grip 3 and her thumb (not shown) can remain in constant contact with the underside of the grip 3. In this embodiment, as in the previous embodiment, the rotation axis of the input gear is nearly parallel with the handlebar's centerline, and therefore perpendicular to the brake lever's pivot axis, so the described geometry avoids collision between the brake and the accelerator while keeping both in positions that are optimal for accessibility.

The benefits of this arrangement are not readily attainable with conventional finger-operated throttle levers. Conventional throttle levers pivot on an axis perpendicular to the handlebar centerline, making their actuation similar to that of the brake lever. Because the actuation paths are similar, a minor adjustment to the shape of the brake lever, as 122, would be insufficient to prevent the brake lever from interfering with or colliding with a conventional throttle lever. Either the conventional finger-operated throttle lever or the brake lever or both would have to be displaced from their ideal locations, thereby sacrificing brake accessibility, throttle accessibility or both.

Third Embodiment

Figure 6:
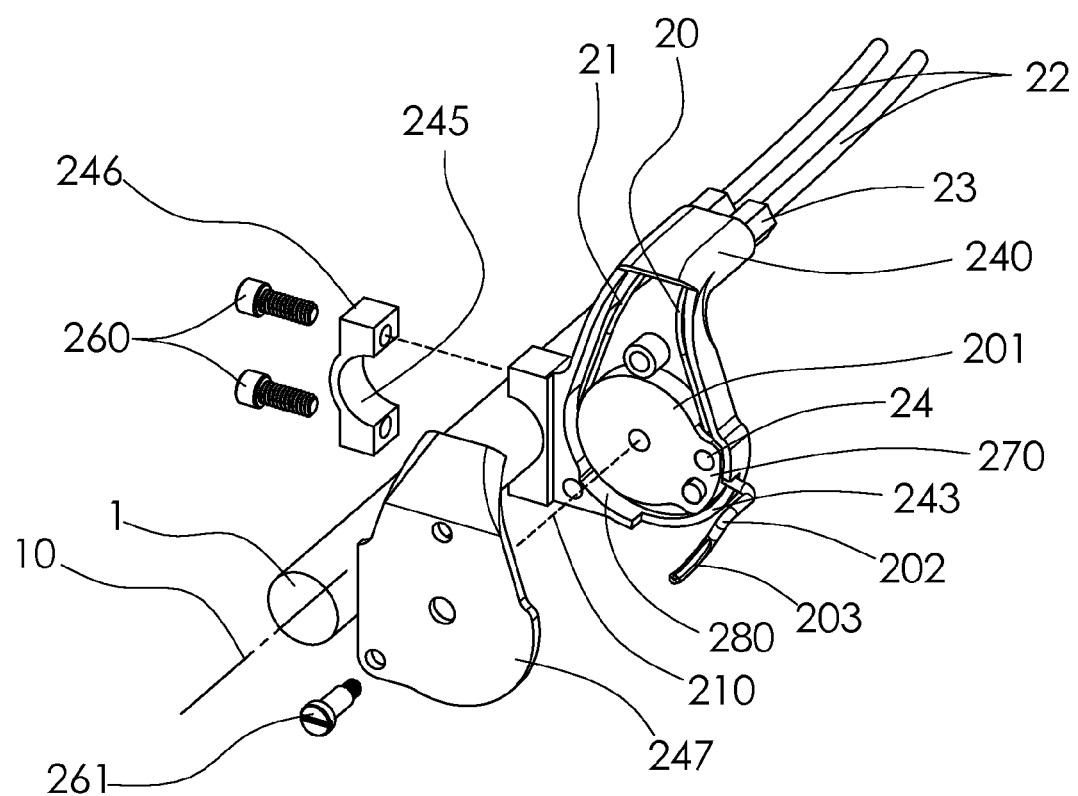
FIG. 6 is an exploded view of a third embodiment.

FIG. 6 depicts an alternative embodiment of the present invention. In this embodiment, the input lever 201 does not contain gear teeth, but it does rotate about a pivot 261 and it contains an integrated cam section similar to that of a spool. Input lever 201 has, attached to it, a lever arm 202 that features a finger-contact section 203. Input lever 201 directly engages cables 20, 21 with a geometry 270 that captivates the cable terminations 24. A housing 240 partially encloses the spool within a housing cavity 280. A slot 243, provides clearance for the lever arm to extend outside the housing 240. The input lever's axis of rotation, the control axis 210 is nearly parallel with the centerline axis 10 of the handlebar 1, but the two axes are offset by enough distance to prevent the input lever from colliding with the handlebar. This housing also includes a cylindrical clamping surface 245 on a separate clamp back 246 that rigidly affixes the assembly to the end portion of the handlebar 1 with the aid of two clamping bolts 260. Unlike the housing 140 from the first embodiment, this housing is not formed of two halves. Instead, it has a removable cover 247 covering the input lever that is adjacent to the rider's hand.

This embodiment illustrates a mode of practicing the invention that avoids the use of gears. A variety of modifications to this embodiment can be used. For example, the axis of rotation of the spool can be nearly parallel, but at a slight angle with the centerline of the handlebar in order to better-match the natural motion of the rider's index finger.

Fourth Embodiment

Figure 7:
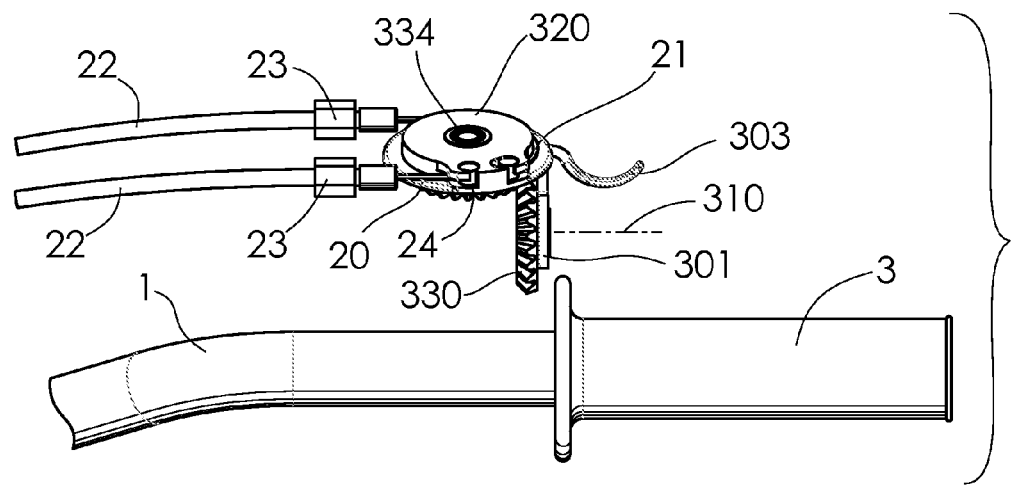
FIG. 7 is a top view showing the arrangement of moving parts in a fourth embodiment.
Figure 8:
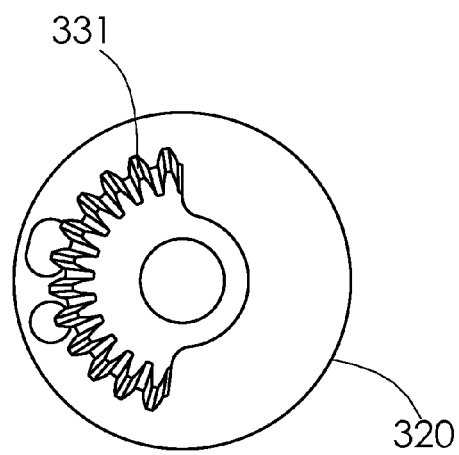
FIG. 8 is a view of the spool of the fourth embodiment showing gear teeth hidden in FIG. 9.
Figure 9:
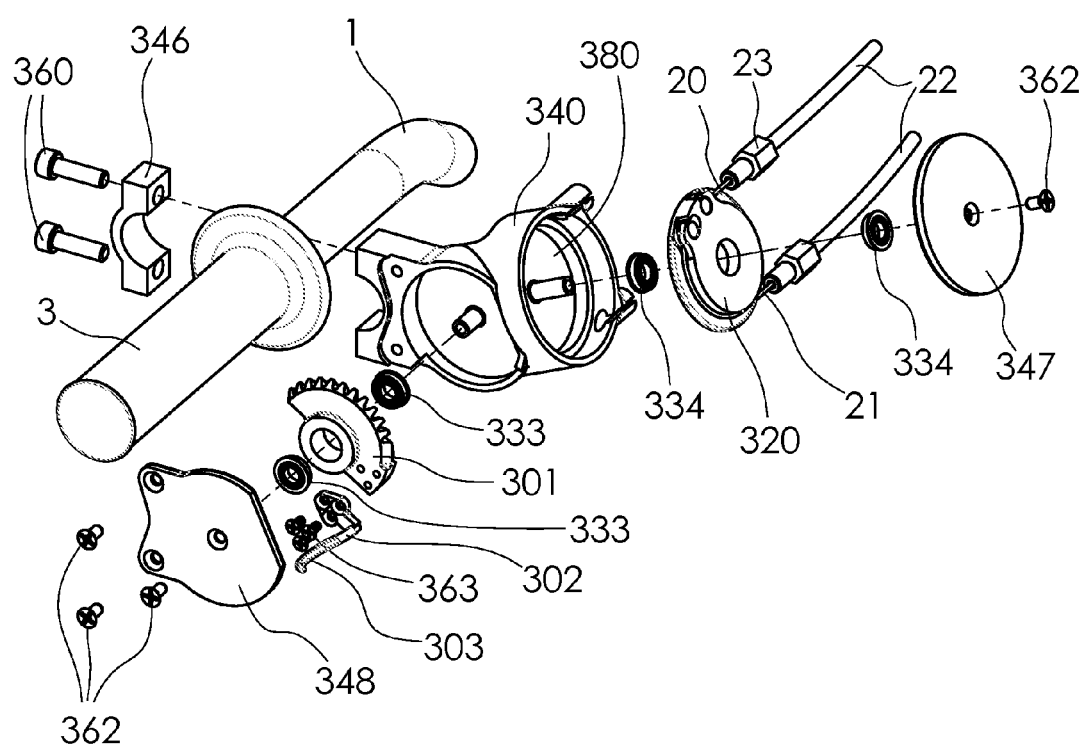
FIG. 9 is an exploded perspective view of the fourth embodiment.

FIGS. 7, 8, 9 show another preferred embodiment to this invention in several views. The primary differences between this embodiment and the first embodiment lie in the orientation of the spool and the geometry and construction of the housing. Referring now to FIG. 7, the arrangement of moveable elements can be clearly understood. Rotatable input lever 301 engages rotatable spool 320 with bevel gear teeth 330. Spool 320 is disposed such that its rotation axis is approximately perpendicular to the rotation axis 310 of the input lever. Input lever is attached to a finger-contact section 303 that allows the finger to operate the accelerator. Referring to FIG. 8, the spool includes bevel gear teeth 331 on the underside, for meshing with those 330 of the input lever.

FIG. 9 shows an exploded view displaying the details of how components are mounted. A housing 340 provides features for mounting bearings 333, 334, which provide support for the input lever 301 and spool 320, while permitting free rotation. The housing 340 mates to a clamp back 346, with two fasteners 360. The housing 340 and clamp back 346 capture the handlebar 1, providing a rigid attachment between the housing 340 and the handlebar. An arm 302 supports the finger contact 303 at a distance offset from the side cover 348 of the housing. The arm is attached to the input lever with several fasteners 363. With the spool mounted in a cavity 380 inside the housing, a spool coverplate 347 attaches to the housing over the spool using a fastener 362 to retain and protect the spool. Similarly, with the input lever mounted inside the housing, the side cover 348 attaches to the housing with fasteners 362 to retain and protect the input lever.

This arrangement is advantageous in that it reduces friction of the system because it allows all moving parts to be mounted on ball or roller-type bearings, and it avoids bending the throttle cables over a stationary surface.

Fifth Embodiment

To apply this invention to electric motor-vehicles, which do not have a throttle valves, it would be particularly appropriate to use an electronic position sensor in lieu of gears, spools and cables to transmit control signals to the vehicle's motor. Nevertheless, certain advantages may be gained by using an electronic sensor and signals in lieu of, or in combination with, mechanical techniques. For example, one could build an accelerator that requires a very small force to operate. Embodiment 5 provides an electronic approach.

Figure 10:
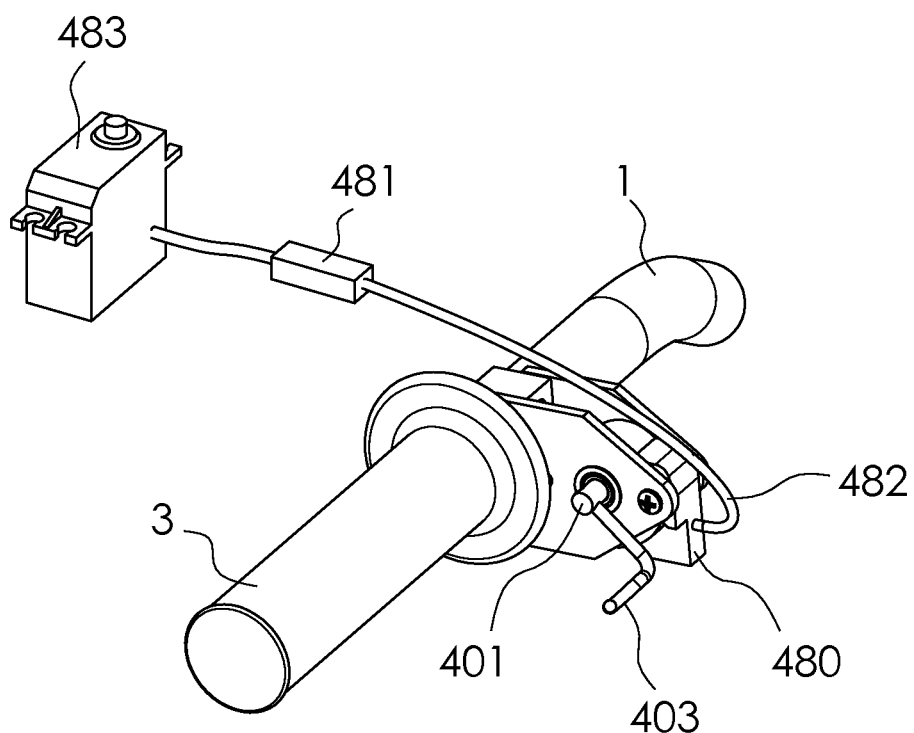
FIG. 10 is a perspective view of a fifth embodiment.

Referring to FIG. 10, an input lever 401 is the rotor of a rotary position sensor 480. The input lever 401 is connected to a finger contact 403 that allows rotation by the rider's index finger. The sensor generates an electrical signal that is conveyed by an electrical cable 482 to a controller 481. The sensor signal could be a simple analog voltage, it could be a digital signal, a timed pulse, or a frequency or phase-shifted wave. The controller interprets the sensor signal and generates a corresponding control signal, to modulate the actuation of a servo 483. The details of how the servo may be utilized to modulate the power produced by the vehicle will depend on the specific vehicle. At least one applicable apparatus is provided in U.S. Pat. No. 7,581,464.

It is not necessary to use a rotatable input lever in practicing this invention. There are various alternatives to creating an index-finger control that moves in the plane of the index finger's maximum mobility which do not utilize a rotatable lever. One such option is to provide, as an input element, a moveable car that runs inside a track. This could be combined with a displacement sensor for measuring the car's position along the track. Potentiometers, capacitive linear encoders similar to those used in digital calipers, inductive, and hall-effect sensors may all be appropriate displacement sensors.

Thus, specific compositions and methods of a finger-operated accelerator mechanism with a natural actuation path have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It must be noted that as used herein and in the appended claims, the singular forms "a", "an", and "the" include plural referents unless the context clearly dictates otherwise.

What is claimed is:

1. A handlebar mounted accelerator for a motor vehicle comprising:

a. an accelerator housing;
b. a handlebar grip;
c. the accelerator housing and the handlebar grip both being affixed to an end portion of a handlebar;
d. an input lever that is unmovably connected to a finger contact so that the input lever and finger contact move together;
e. wherein the input lever is pivotally mounted to the housing, being configured to constrained rotation, with respect to the handlebar, about an input lever rotation axis;
f. wherein the input lever rotation axis is fixed relative to the handlebar;
g. wherein the input lever rotation axis is spatially offset forward from the handlebar;
h. wherein rotation of the input lever about the input lever rotation axis controls the power output of the vehicle;
i. wherein the finger contact allows the input lever to be rotated about the input lever rotation axis by the flexion of an operator's index finger;
j. wherein the input lever rotation axis is parallel with a centerline axis of the portion of the handlebar that supports the grip.

2. The accelerator according to claim 1 further comprising a linkage mechanism that engages one end of a throttle cable.

3. The accelerator according to claim 1 wherein the input lever engages one end of a throttle cable.

4. The accelerator according to claim 1 wherein the input lever is coupled to one end of a throttle cable.

5. The accelerator according to claim 1 further comprising an arm extending from the input lever, a portion of which forms the finger contact.

6. The accelerator according to claim 5 wherein the input lever is mounted on a bearing and wherein the rotational center of the bearing is located between 25 and 50 millimeters from the centerline axis of the portion of the handlebar that supports the grip.

7. The accelerator according to claim 6 wherein the finger contact is radially located between 15 and 40 millimeters from the input lever rotation axis.

8. The accelerator according to claim 7 wherein the center of the bearing is located forward of the handlebar in a region of space between 25 millimeters above and 10 millimeters below the centerline axis of the portion of the handlebar that supports the grip.

9. The accelerator according to claim 1 further comprising a rotatably mounted spool engaged to one end of a throttle cable, the rotation of the spool being coupled to the rotation of the input lever, and the spool being disposed within a cavity in the housing.

10. The accelerator according to claim 9 wherein the input lever and spool are rotatably coupled by meshing gear teeth.

11. The accelerator according to claim 10 wherein the spool rotates about an axis that is oriented approximately perpendicular to the input lever rotation axis.

12. The accelerator according to claim 11 additionally comprising a brake lever mounted adjacent to the accelerator, the brake lever having an intermediate section that extends away from the handlebar to provide clearance between the finger contact and brake lever during vehicle operation.

13. The accelerator according to claim 10 wherein the spool encircles a portion of the handlebar.

14. The accelerator according to claim 1 and;

b. a brake lever configured for operation by a user's hand that operates the accelerator;

c. the brake lever having an intermediate section that extends away from the handlebar providing clearance for rotation of the input lever.

15. The accelerator according to claim 1 further comprising a position sensor coupled to the finger contact such that motion of the finger contact alters an electrical signal generated by the sensor.

16. The accelerator according to claim 15 additionally comprising a controller that accepts as an input the electrical signal generated by the sensor and produces a corresponding output signal, the output signal being related to the input signal by a non-linear function that is implemented in the controller.

17. The accelerator according to claim 1 further comprising:
   a. a rotational position sensor coupled to the finger contact such that rotation of the input lever alters an electrical signal generated by the sensor; and
   b. the electrical signal being coupled to the power output of the vehicle.

18. The accelerator according to claim 17 additionally comprising a controller that accepts as an input the electrical signal generated by the sensor and produces a corresponding output signal, the output signal being related to the input signal by a non-linear function that is implemented in the controller.

* * * * *